United States Patent
Nakajima et al.

(10) Patent No.: US 6,253,335 B1
(45) Date of Patent: Jun. 26, 2001

(54) NETWORK ABNORMALITY RECOVERY METHOD AND SYSTEM

(75) Inventors: Katsutoshi Nakajima; Hiroshi Nishiyama; Katsumi Murakami; Akira Norizuki; Yoshiyuki Furuya, all of Shizuoka (JP)

(73) Assignee: Yazaki Coporation, Tokyo (JP)

( * ) Notice: Subject to any disclaimer, the term of this patent is extended or adjusted under 35 U.S.C. 154(b) by 0 days.

(21) Appl. No.: 09/060,254

(22) Filed: Apr. 15, 1998

(30) Foreign Application Priority Data

Apr. 15, 1997 (JP) .................................................. 9-097545
Mar. 27, 1998 (JP) ................................................ 10-082035

(51) Int. Cl.⁷ .................................................. G06F 11/00
(52) U.S. Cl. .................................................. 714/15; 714/4
(58) Field of Search .................................. 714/4, 12, 14, 714/15, 21, 25, 39, 46, 47, 798; 709/224, 221, 239, 240, 244, 248, 249, 251; 370/216–228, 447, 450, 452, 460, 258

(56) References Cited

U.S. PATENT DOCUMENTS 4,710,915 * 12/1987 Kitahara ................................ 370/224
5,321,803 * 6/1994 McMillen et al. ..................... 714/798
6,012,150 * 1/2000 Bartfai et al. ............................. 714/4

FOREIGN PATENT DOCUMENTS

06077979A * 3/1994 (JP) .
08065331    8/1996 (JP) .
08265319   11/1996 (JP) .
08307321   11/1996 (JP) .

* cited by examiner

Primary Examiner—James P. Trammell
Assistant Examiner—Pierre Eddy Elisca
(74) Attorney, Agent, or Firm—Morgan, Lewis & Bockius LLP

(57) ABSTRACT

A network abnormality recovery method and system capable of recovering the normal state of a network communication function as soon as possible even if the network communication function is impaired. When it is determined that a network communication function is impaired because a broken line occurs on a main data transmission line or an abnormal condition occurs in a communication IC, a CPU of a station unit transmits network maintaining information required for maintaining the network communication function to another CPU of a master station unit over a sub data transmission line provided separately from the main data transmission line, thereby recovering the normal state of the network communication function as soon as possible.

48 Claims, 5 Drawing Sheets

NETWORK ABNORMALITY RECOVERY METHOD AND SYSTEM

BACKGROUND OF THE INVENTION

1. Field of the Invention

This invention relates to a network comprising a plurality of station units connected by a main data transmission line like a ring enabling circular transmission of communication data in digital form and adopting a master/slave method as a communication method and, in particular to a network abnormality recovery method and system capable of recovering the normal state of a network communication function as soon as possible even if the network communication function is impaired because of a broken line of the main data transmission line, an abnormality in communication means for controlling transmission and reception of communication data, or the like.

2. Description of the Related Art

Hitherto, a network generally has been known which comprises a plurality of station units connected by a ring-like data transmission line enabling circular transmission of communication data in digital form.

To exchange communication data between station units in a network configured as described above, first a communication IC for executing communication control concerning transmission and reception of communication data is provided for each station unit and communication data is sent from the communication IC in the station unit of the transmitting party in a predetermined direction on a data transmission line. The communication IC in each station unit downstream from the transmitting party on the data transmission line determines whether or not the address of the home station unit is specified as the receiving party. If the address of the home station unit is not specified as the receiving party, the communication IC sends the communication data to the station unit downstream from the home station unit over the data transmission line. On the other hand, if the address of the home station unit is specified as the receiving party, the communication IC reads the communication data over the data transmission line, thereby exchanging the communication data between the station units.

Of the networks configured as described above, hitherto a network adopting a master/slave method as a communication method has also been known. This network consists of one master station unit operating as the master and other slave station units operating as slaves.

In the network adopting the master/slave method, the master station unit performs operation management of all station units making up the network and maintains the network communication function in the normal state as a network maintaining function, and each slave station unit usually stands by in a reception wait state and upon reception of communication data containing control information for each slave station unit such as transmission start or reception start sent from the master station unit, the slave station unit suitably transmits and receives communication data including source data containing audio or video information and control data containing slave station unit control information.

However, according to the conventional network adopting the master/slave method as the communication method, if a broken line of the data transmission line occurs or an abnormal condition such as a failure occurs in the communication IC contained in a slave station unit at a midpoint position on the route between the transmitting party and the receiving party, the station units downstream from the broken data transmission line or the station unit falling into the abnormal condition cannot receive the communication data and thus are not given a transmission opportunity of communication data generated by the downstream station units. Resultantly, a problem of interfering with the information centralized management function of the master station unit for executing centralized management of control data, etc., sent from all slave station units, to be solved is involved.

SUMMARY OF THE INVENTION

It is therefore an object of the invention to provide a network abnormality recovery method wherein if a network communication function is impaired because of a broken line of a main data transmission line, an abnormality in communication means for controlling transmission and reception of communication data, or the like, station units transmit at least network maintaining information required for maintaining the network communication function to a master station unit, whereby the normal state of the network communication function can be recovered as soon as possible even if the network communication function is impaired.

It is another object of the invention to provide a network abnormality recovery system which can recover the normal state of a network communication function as soon as possible even if the network communication function is impaired.

In order to achieve the above object, according to the invention, there is provided a network abnormality recovery method in a network comprising a plurality of station units connected by a main data transmission line like a ring enabling circular transmission of communication data in digital form and adopting a master/slave method as a communication method, wherein the plurality of station units consist of one master station unit operating as a master and slave station units operating as slaves and wherein the network comprises one or more sub data transmission lines being provided separately from the main data transmission line for connecting the station units, the method comprising the steps of: executing monitor processing of monitoring a communication state in the network; executing abnormality determination processing of determining whether or not the network communication state is abnormal upon reception of the monitor processing result; and when it is determined that the network communication state is abnormal as a result of the abnormality determination processing, executing route switch control of switching a route of communication data generated by each slave station unit from the main data transmission line to the sub data transmission line and executing maintaining information transmission processing of transmitting at least network maintaining information required for maintaining the network communication function to the master station unit over the sub data transmission line set by the route switch control, by each of the plurality of station units.

There is further provided a network abnormality recovery method in a network comprising a plurality of station units connected by a main data transmission line like a ring enabling circular transmission of communication data in digital form and adopting a master/slave method as a communication method, wherein the plurality of station units consist of one master station unit operating as a master and slave station units operating as slaves and wherein the network comprises one or more sub data transmission lines being provided separately from the main data transmission line for at least connecting the master station unit and the slave station units in a one-to-one correspondence, the method comprising the steps of: executing monitor processing of monitoring a communication state in the network; executing abnormality determination processing of determining whether or not the network communication state is abnormal upon reception of the monitor processing result; and when it is determined that the network communication state is abnormal as a result of the abnormality determination processing, executing route switch control of switching a route of communication data generated by each slave station unit from the main data transmission line to the sub data transmission line and executing maintaining information transmission processing of transmitting at least network maintaining information required for maintaining the network communication function to the master station unit over the sub data transmission line set by the route switch control, by each of the plurality of station units.

Also, there is provided a network abnormality recovery system in a network comprising a plurality of station units connected by a main data transmission line like a ring enabling circular transmission of communication data in digital form and adopting a master/slave method as a communication method, wherein the plurality of station units consist of one master station unit operating as a master and slave station units operating as slaves, and wherein the network comprises one or more sub data transmission lines being provided separately from the main data transmission line for connecting the station units, characterized in that each of the plurality of station units comprises: monitor means for executing monitor processing of monitoring a communication state in the network; abnormality determination means for executing abnormality determination processing of determining whether or not the network communication state is abnormal upon reception of the monitor processing result of the monitor means; route switch control means of executing route switch control of switching a route of communication data generated by each slave station unit from the main data transmission line to the sub data transmission line when it is determined that the network communication state is abnormal as a result of the abnormality determination processing of the abnormality determination means; and maintaining information transmission means for transmitting at least network maintaining information required for maintaining the network communication function to the master station unit over the sub data transmission line set by switching the route when the communication data route is switched from the main data transmission line to the sub data transmission line by the route switch control of the route switch control means.

There is further provided a network abnormality recovery system in a network comprising a plurality of station units connected by a main data transmission line like a ring enabling circular transmission of communication data in digital form and adopting a master/slave method as a communication method, wherein the plurality of station units consist of one master station unit operating as a master and slave station units operating as slaves, and wherein the network comprises one or more sub data transmission lines being provided separately from the main data transmission line for at least connecting the master station unit and the slave station units in a one-to-one correspondence, characterized in that each of the plurality of station units comprises: monitor means for executing monitor processing of monitoring a communication state in the network; route switch control means of executing route switch control of switching a route of communication data generated by each slave station unit from the main data transmission line to the sub data transmission line when it is determined that the network communication state is abnormal as a result of the abnormality determination processing of the abnormality determination means; and maintaining information transmission means for transmitting at least network maintaining information required for maintaining the network communication function to the master station unit over the sub data transmission line set by switching the route when the communication data route is switched from the main data transmission line to the sub data transmission line by the route switch control of the route switch control means.

DETAILED DESCRIPTION OF THE PREFERRED EMBODIMENTS

Referring now to the accompanying drawings, there are shown preferred embodiments of a network abnormality recovery system according to the invention.

Figure 1:
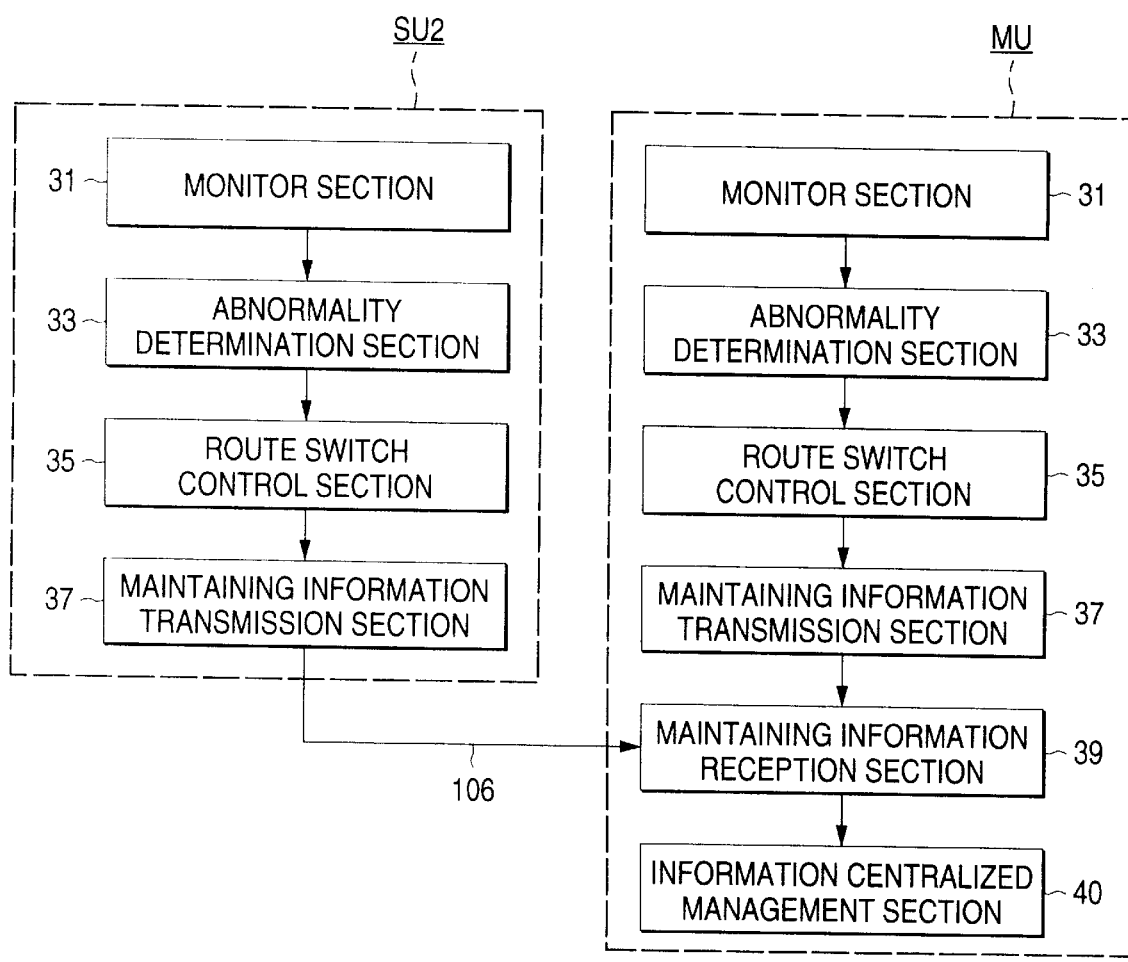
FIG. 1 is a schematic block diagram to show the main part of a network abnormality recovery system according to the invention.
Figure 2:
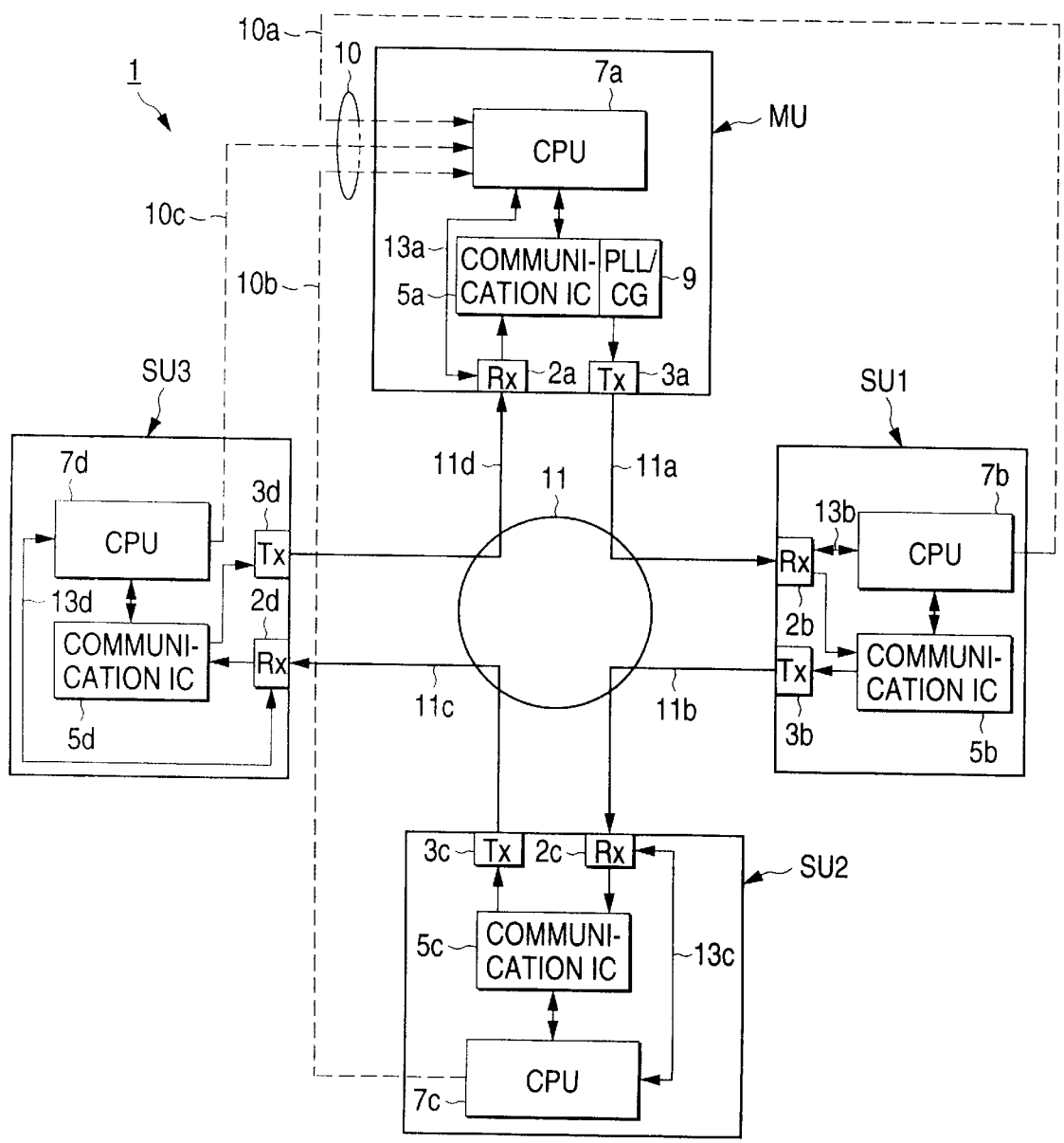
FIG. 2 is a schematic block diagram of an abnormality recovery system according to a first embodiment of the invention.
Figure 3:
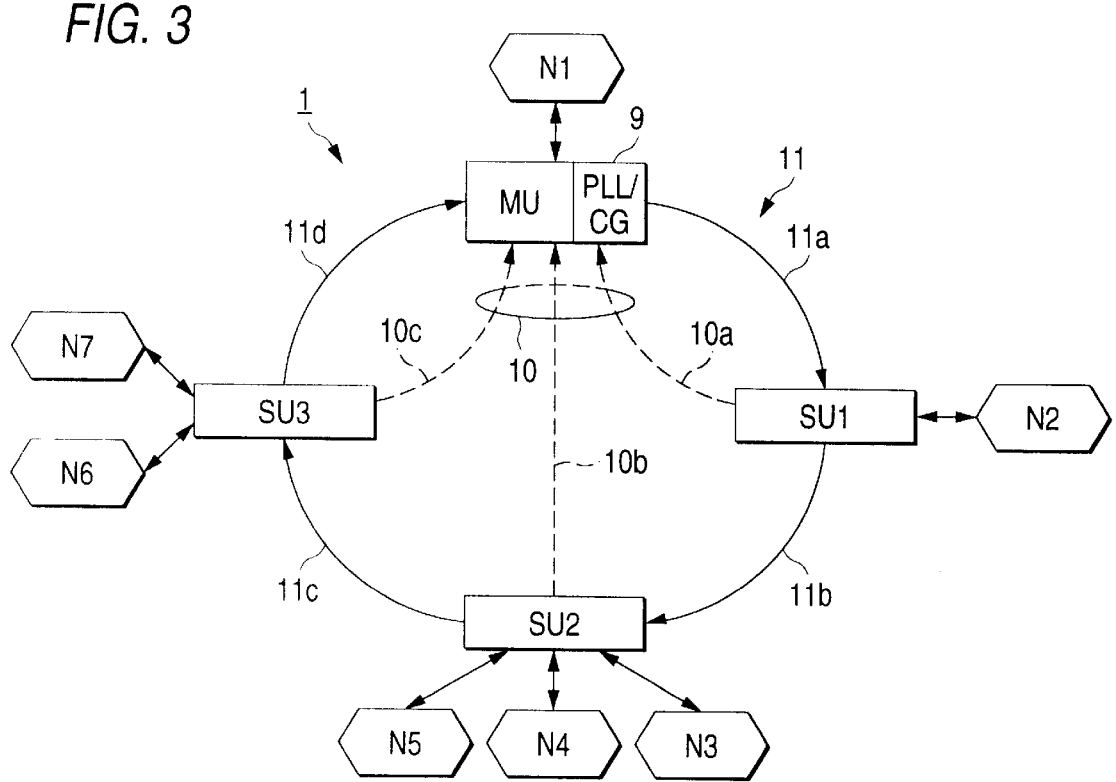
FIG. 3 is a general block diagram of the abnormality recovery system according to the first embodiment of the invention.
Figure 4:
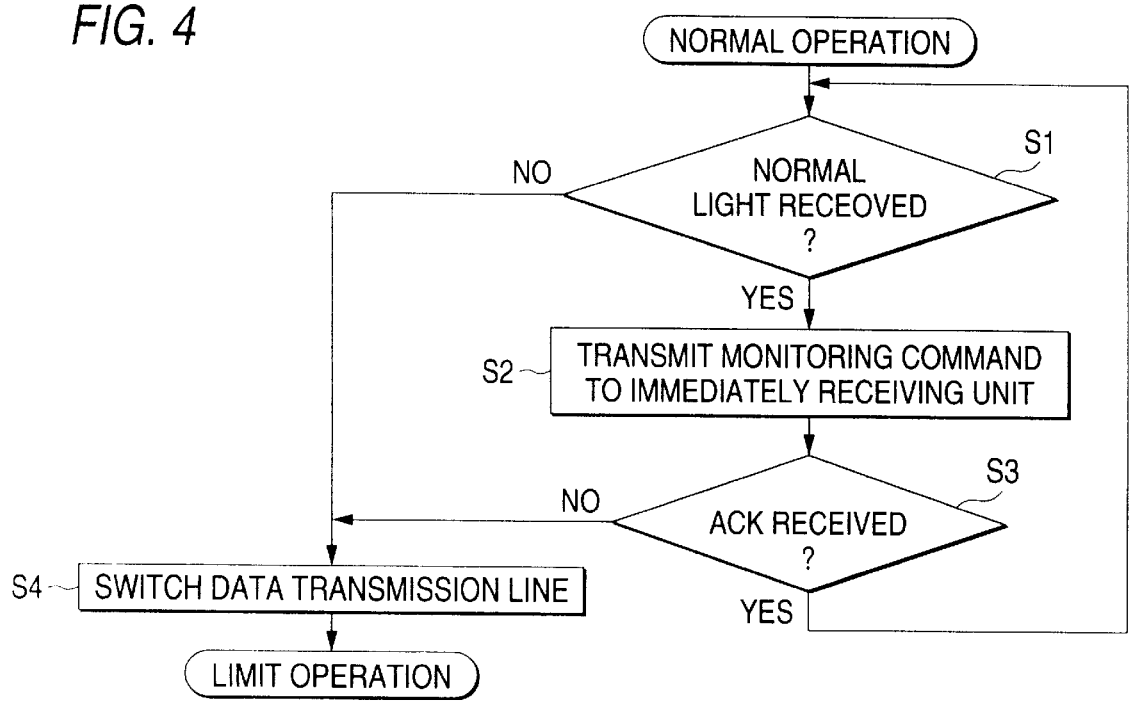
FIG. 4 is a flowchart of the operation of the abnormality recovery system according to the first embodiment of the invention.
Figure 5:
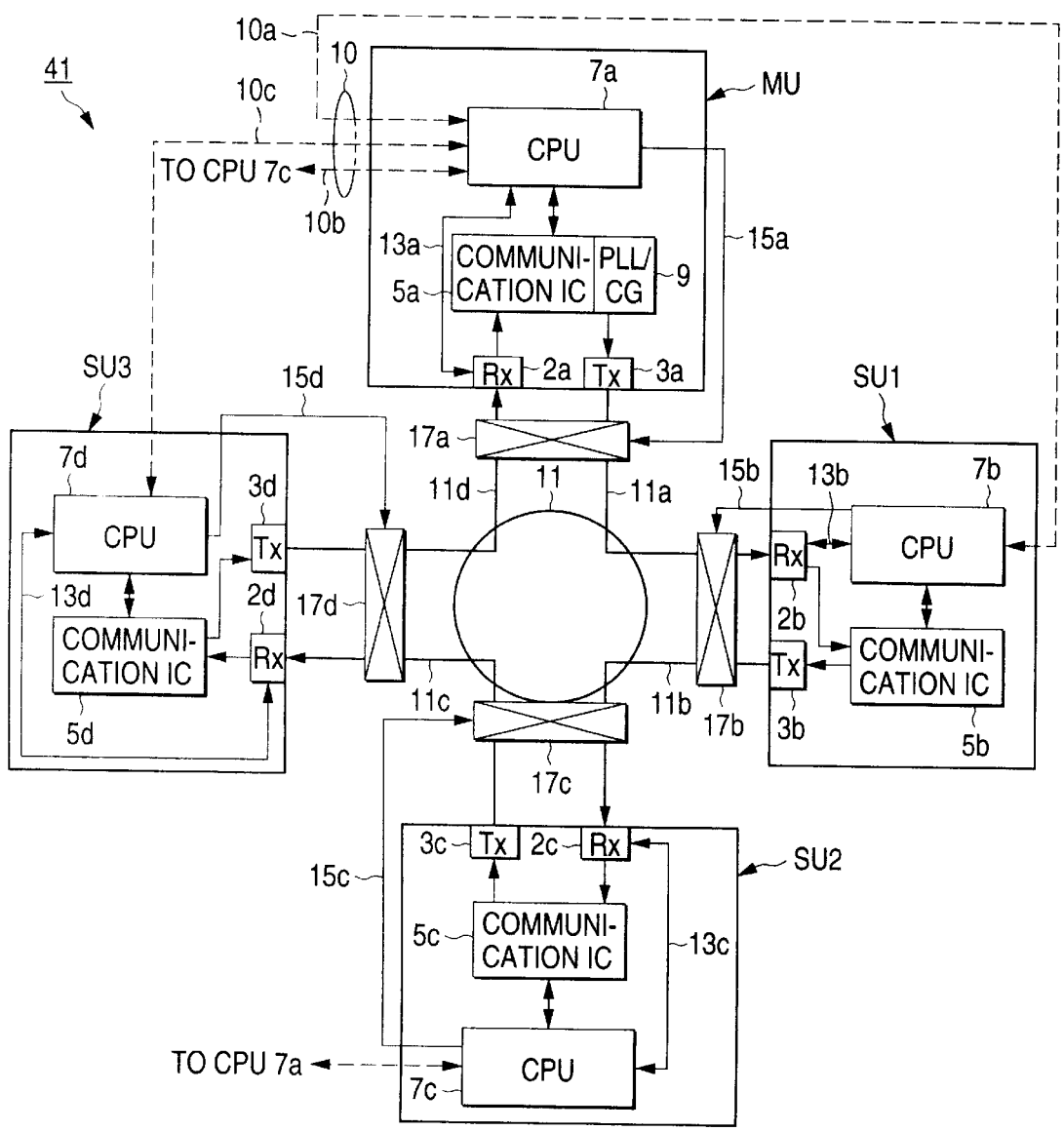
FIG. 5 is a schematic block diagram of an abnormality recovery system according to a second embodiment of the invention.
Figure 6:
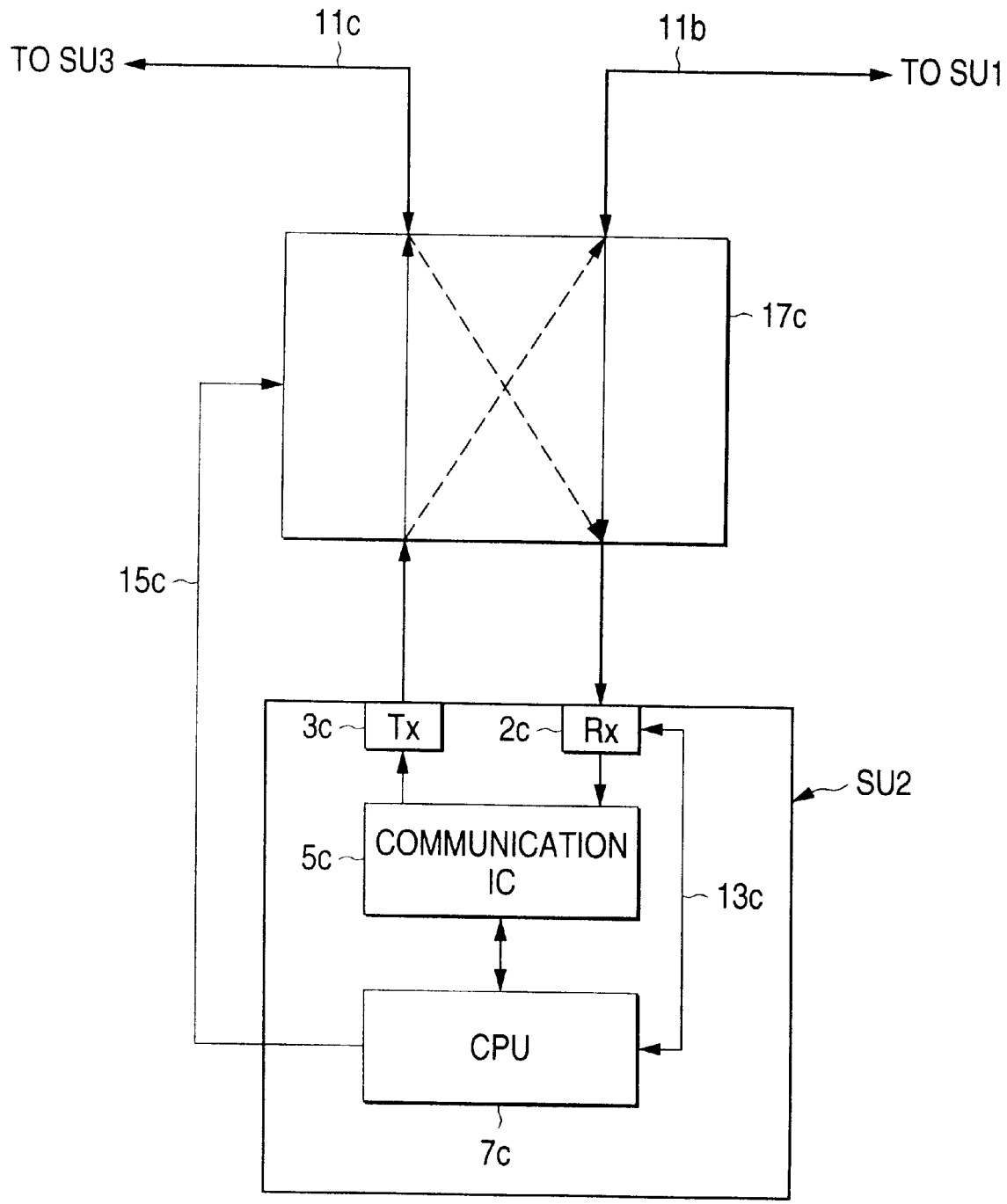
FIG. 6 is a partially enlarged diagram of the abnormality recovery system according to the second embodiment of the invention.

FIG. 1 is a schematic block diagram to show the main part of a network abnormality recovery system according to the invention. FIG. 2 is a schematic block diagram of an abnormality recovery system according to a first embodiment of the invention. FIG. 3 is a general block diagram of the abnormality recovery system according to the first embodiment of the invention. FIG. 4 is a flowchart of the operation of the abnormality recovery system according to the first embodiment of the invention. FIG. 5 is a schematic block diagram of an abnormality recovery system according to a second embodiment of the invention. FIG. 6 is a partially enlarged diagram of the abnormality recovery system according to the second embodiment of the invention. The first and second embodiments of applying the invention to a network for connecting various devices disposed in the room of a vehicle will be discussed.

First, the general configuration of an abnormality recovery system according to the first embodiment of the invention will be discussed with reference to FIG. 3. An abnormality recovery system 1 is applied to a network which comprises a plurality of station units connected by a main data transmission line 11 exhibiting ring-like topology enabling transmission of digital data in a single direction, wherein digital data is transferred from a transmitting station unit to a receiving station unit over the main data transmission line 11, whereby the station units can exchange the data with each other. The abnormality recovery system 1 can monitor the network communication state and recover the normal state of a network communication function when the network communication state becomes abnormal.

An appropriate information transmission medium, such as a plastic optical fiber or an electric wire, can be adopted as the main data transmission line 11. The embodiment adopts a plastic optical fiber as the main data transmission line 11 and circulates digital data clockwise for transmission.

A master/slave method is adopted as a communication method among the station units in the network, wherein one of the station units operates as a master station unit MU and other units operate as slave station units SUs.

In the network configured as described above, the master station unit MU performs operation management of the whole network and recovers the normal state of the network communication function and each slave station unit SU usually stands by in a reception wait state and when receiving communication data such as transmission start or reception start sent from the master station unit MU, transmits or receives communication data in response to the received data.

Communication data circularly transmitted in the network includes source data containing audio information of digital audio data, etc., or video information of digital video data, etc., control data containing control information in each slave station unit SU, etc., appropriately.

The master station unit MU and each of slave station units SUs are connected in a one-to-one correspondence by a sub data transmission line 10 separate from the main data transmission line 11. Alternatively, the station units can also be connected by a sub data transmission line 10 separate from the main data transmission line 11. In this case, for example, a ring-like sub data transmission line 10 like the main data transmission line 11 can also be connected.

When one of the slave station units SUs senses that an abnormality occurs in the network, the sub data transmission line 10 corresponding to the slave station unit SU becomes necessary for maintaining the network communication function. For example, it is used to transmit network maintaining information including control data containing control information for each slave station unit SU and abnormality occurrence information indicating abnormality occurrence and the abnormality occurrence point to the master station unit MU separately.

Considering the capability of transmitting the network maintaining information, an information transmission medium such as electric wire of a low transmission capacity as compared with the main data transmission line 11 can be adopted appropriately as the sub data transmission line 10.

A wake-up signal line used when the master station unit MU and each of slave station units SUs are connected in a one-to-one correspondence and a wake-up signal as a power-on command of each slave station unit is transmitted from the master station unit MU to each slave station unit can be applied as the information transmission medium.

A power line used to supply power to each station unit can also be applied as the information transmission medium.

An analog signal line used when the station units are connected and exchange analog communication data with each other can also be applied as the information transmission medium. Video information, audio information, etc., can be named as the analog communication data.

Moreover, an analog signal line used when the master station unit MU and each of slave station units SUs are connected in a one-to-one correspondence and they exchange analog communication data with each other can also be applied as the information transmission medium.

In any case, an already installed line in the network is applied as the information transmission medium. Therefore, a network abnormality recovery system that can maintain the network management function of the master station unit MU in the normal state can be provided without additionally installing a new sub data transmission line 10.

A suitable device Nl, such as a compact disc (CD) changer, an audio amplifier, a digital video disc (DVD) unit, a radio receiver, a portable telephone, a navigation system, a digital television set, or a controller of an air conditioner, is connected to the master station unit MU. More than one device can also be connected to the master station unit MU.

The master station unit MU contains a phase locked loop/clock generator (PLL/CG) 9 having the capabilities of generating a reference clock such as a system clock SYCLK used as the operation timing of the whole network and maintaining the phase of the generated reference clock with high accuracy. It has the capabilities of inputting various pieces of data including source data such as digital audio data or digital video data, control data, for each unit, etc., sent from the device Nl, adding header information containing transmitting and receiving parties to the various data pieces and the system clock SYCLK supplied from the PLL/CG 9 to produce a packet, modulating the packet data, and sending the modulated packet data to the main data transmission line 11. On the other hand, the master station unit MU has the capabilities of inputting various pieces of data sent from the slave station units SUs, demodulating the various pieces of data, and selectively sending the demodulated data to the device Nl. It also has an information centralized management function of managing network maintaining information gotten from the slave station units SUs in a centralized manner and a network recovery function of recovering the normal state of the network communication function.

One or more devices N2 to N7 are connected to each of the slave station units SU1, SU2, and SU3. Each slave station unit SU has a data communication function of inputting packet data sent from the master station MU or any other slave station unit SU, demodulating the input packet data, selectively distributing various pieces of data to the devices N2 to N7 in synchronization with the system clock SYCLK, etc., gotten from the demodulated data, inputting various pieces of data including control data containing device control information or source data sent from the devices N2 to N7, adding header information to the various data pieces to produce a packet, modulating the packet data, and sending the modulated packet data to the main data transmission line 11 and an information transmission function of transmitting network maintaining information and abnormality occurrence information indicating abnormality occurrence and the abnormality occurrence point to the master station unit MU over the sub data transmission line 10 when it is determined that the network communication function is impaired.

Next, the slave station units SUs and the master station unit MU making up the abnormality recovery system 1 will be discussed separately with reference to FIGS. 1 and 2. The members of the slave station units SUs and the master station unit MU having identical or similar functions are designated by the same reference numerals. Since the slave station units SU1, SU2, and SU3 have the same internal configuration, the slave station unit SU2 is taken as a representative example for describing the internal configuration of the slave station units SUs.

As shown in FIG. 2, the slave station unit SU2 comprises an optical receiver 2c for receiving light containing various pieces of data sent in light signal form from the upstream station unit SU1 over the main data transmission line 11b, converting the received light signal into electric signal form, and sending packet data containing the various pieces of data converted into the electric signal form; a communication IC 5c having the capabilities of taking the packet data sent from the optical receiver 2c, demodulating the taken packet data, selectively distributing the various pieces of data to the devices N3 to N5 connected to the slave station unit SU2 in synchronization with the system clock SYCLK, etc., gotten from the demodulated data, taking various pieces of data sent from the devices N3 to N5, adding header information to the various data pieces to produce a packet, modulating the packet data, and sending the modulated packet data to the main data transmission line 11; an optical transmitter 3c for converting the packet data in electric signal form sent from the communication IC 5c into light signal form and sending the packet data converted into the light signal form to the main data transmission line 11 in light blink form; and a central processing unit (CPU) 7c having the capabilities of performing operation monitor and operation control of the communication IC 5c, etc.

On the other hand, as shown in FIG. 2, the master station unit MU comprises an optical receiver 2a; a communication IC 5a containing a phase locked loop/clock generator 9; an optical transmitter 3a; and a CPU 7a having an information centralized management function, etc., described later.

The internal configuration of the CPU 7c contained in the slave station unit SU2 will be discussed in more detail with reference to FIG. 1. The CPU 7c comprises a monitor section 31 functioning as monitor means for executing monitor processing of monitoring the network communication state; an abnormality determination section 33 functioning as abnormality determination means for executing abnormality determination processing of determining whether or not the network communication state is abnormal upon reception of the monitor processing result of the monitor section 31; a route switch control section 35 functioning as route switch control means for executing route switch control of switching the route of the communication data generated by the slave station unit SU2 from the main data transmission line 11 to the sub data transmission line 10 when the abnormality determination section 33 determines that the network communication state is abnormal; and a maintaining information transmission section 37 functioning as maintaining information transmission means for executing maintaining information transmission processing of transmitting at least network maintaining information required for maintaining the network communication function to the master station unit MU over the sub data transmission line 10 set by switching the route when the communication data route is switched from the main data transmission line 11 to the sub data transmission line 10 under the route switch control of the route switch control section 35.

The CPU 7c having the above configuration continuously inputs and monitors the optical reception state in the optical receiver 2c via a communication line 13c and when it is determined that the network communication function is impaired because an abnormality such as a broken line occurs on the main data transmission line 11 or the communication IC 5c falls into an abnormal condition, transmits network maintaining information and abnormality occurrence information to the master station unit MU over the sub data transmission line 10b.

On the other hand, the internal configuration of the CPU 7a contained in the master station unit MU will be discussed in more detail with reference to FIG. 1. The CPU 7a further comprises a maintaining information reception section 39 functioning as maintaining information reception means having a maintaining information reception function of receiving network maintaining information, etc., transmitted from the station units containing the master station unit MU; and an information centralized management section 40 functioning as information centralized management means having an information centralized management function of managing network maintaining information for each station unit received at the maintaining information reception section 39 in a centralized manner, in addition to the sections of the CPU 7c contained in the slave station unit SU2 described above.

The CPU 7a having the above configuration continuously monitors the network maintaining information or abnormality occurrence information sent from each station unit SU via the sub data transmission line 10 and when receiving at least either of the network maintaining information and abnormality occurrence information, reads the information and manages the network maintaining information received from all station units SUs in a centralized manner.

When the network maintaining information is transmitted from each station unit SU via the sub data transmission line 10 to the master station unit MU, a direct communication method between the CPUs contained in the units is adopted. Thus, even if the communication IC 5b, for example, falls into a communication-impossible state, the master station unit MU can be reliably notified of the event.

Next, the operation of the network abnormality recovery system according to the invention will be discussed with reference to FIG. 4.

First, at step S1, the CPU 7 contained in each slave station unit SU continuously inputs and monitors the optical reception state in the optical receiver 2 over the communication cable 13 and determines whether or not the optical receiver 2 receives a normal light signal. If the optical receiver 2 receives a normal light signal as a result of the light signal reception determination at step S1, the CPU 7 instructs the communication IC 5 to transmit a monitoring command to the immediately preceding station unit at step S2. Upon reception of the monitoring command transmission instruction, the communication IC 5 adds header information specifying the address of the home station unit as the transmitting party and the address of the immediately preceding station unit as the receiving party to the monitoring command to be transmitted to produce a packet, modulates the packet data, and sends the modulated packet data to the optical transmitter 3, which then converts the packet data sent from the communication IC 5 into light signal form and sends the packet data converted into the light signal form to the main data transmission line 11 in light blink form. The station unit addressed as the receiving party adds acknowledge (ACK) code indicating that the packet data has been received to the packet data and returns the packet data with the ACK over the main data transmission line 11 to the transmitting station unit.

Next, the CPU 7 determines whether or not the returned packet data contains ACK code at step S3. If the returned packet data contains ACK code as a result of the ACK reception determination at step S3, the CPU 7 returns control to step S1 and repeats the process. The steps S1 to S3 are a process flow applied when the network communication function is maintained in the normal state.

On the other hand, a process flow applied when the network communication function falls into an abnormal condition will be discussed. If the optical receiver 2 does not receive a normal light signal as a result of the light signal reception determination at step S1, the CPU 7 in the slave station unit SU assumes some abnormality to occur in the optical receiver 2, the light signal route to the optical receiver 2, or any other station unit, and performs switch control to switch the communication data route so as to transmit the network maintaining information for each slave station unit SU and the abnormality occurrence information to the master station unit MU over the sub data transmission line 10 provided separately from the main data transmission line 11. If packet data containing ACK code is not received, namely, if normal data communication does not hold although the light signal is received, the CPU 7 assumes that the communication IC 5 in the home station unit falls into an abnormal condition, and performs switch control to switch the communication data route so as to transmit the network maintaining information and the abnormality occurrence information to the master station unit MU over the sub data transmission line 10 at step S4. Upon reception of the network maintaining information and the abnormality occurrence information from each slave station unit SU, the master station unit MU realizes the information centralized management function of executing centralized management of the network maintaining information of the slave station units SUs, analyzes the abnormality occurrence information indicating abnormality occurrence and the abnormality occurrence point in the network, and displays the analyzed abnormality occurrence information on display means such as a display panel (not shown). The network maintaining information managed in the master station unit MU in a centralized manner is, for example, sent to various devices connected to the master station unit MU and is used to control the operation of the devices, etc.

Thus, the network abnormality recovery system according to the first embodiment can recover the normal state of the network communication function as soon as possible even if the network communication function is impaired.

Since the abnormality occurrence information indicating the abnormality occurrence and the abnormality occurrence point is managed under the master station unit MU in a unified manner, when the network communication function falls into an abnormal condition, maintenance of the network can be easily accomplished by analyzing the abnormality occurrence information managed in the unified manner.

Next, an abnormality recovery system 41 according to a second embodiment of the invention will be discussed with reference to FIGS. 5 and 6 centering on the differences from the abnormality recovery system 1 according to the first embodiment.

As shown in FIGS. 5 and 6, the abnormality recovery system 41 according to the second embodiment of the invention adopts a main data transmission line 11 enabling bidirectional communication data transmission, wherein sending direction switch sections 17a to 17d for switching the communication data sending direction from each station unit MU, SU clockwise or counterclockwise are provided so as to spread across paired lines of the main data transmission line 11 connected to the station units MU and SUs, and CPUs 7a to 7d and the sending direction switch sections 17a to 17d are connected by communication lines 15a to 15d respectively.

According to the abnormality recovery system 41 according to the second embodiment, as shown in FIGS. 5 and 6, if it becomes impossible to transmit communication data from the slave station unit SU2 to the master station unit MU, for example, as a data transmission line 11c connecting the slave station units SU2 and SU3 is broken, the CPU 7c of the slave station unit SU2 sends a sending direction switch command to the sending direction switch section 17c and with the communication data sending direction switched counterclockwise, transmits communication data from the slave station unit SU2 to the master station unit MU.

Therefore, the abnormality recovery system according to the second embodiment can recover the normal state of the network communication function as soon as possible even if the network communication function is impaired.

The invention is not limited to the above-described embodiments and can be embodied in other forms.

That is, if it becomes impossible to transmit communication data from a slave station unit to the master station unit, for example, as the main data transmission line is broken, a shielded line, etc., covering the surrounding of the main data transmission line can also be applied as a sub data transmission line for transmitting network maintaining information from the slave station unit to the master station unit.

A form that can be adopted in the invention is as follows: If at least either of the network maintaining information reception function and the information centralized management function of the master station unit falls into an abnormal condition, any one of the station units except the master station unit making up the abnormality recovery system operates as an alternative master station unit, whereby the network is reconstructed.

In doing so, even if the master station unit falls into a communication-impossible state, the normal state of the network communication function can be recovered as soon as possible.

In this case, the station unit operating as the alternative master station unit can be determined according to a predetermined priority.

In doing so, even if the alternative master station unit as well as the master station unit falls into a communication-impossible state, the normal state of the network communication function can be recovered as soon as possible.

According to the network abnormality recovery method of the invention, each of the station units executes monitor processing of monitoring the communication state in the network, executes abnormality determination processing of determining whether or not the network communication state is abnormal upon reception of the monitor processing result, and when it is determined that the network communication state is abnormal as a result of the abnormality determination processing, executes route switch control of switching the route of communication data generated by each slave station unit from the main data transmission line to the sub data transmission line and executes maintenance information transmission processing of transmitting at least network maintaining information required for maintaining the network communication function to the master station unit over the sub data transmission line set by the route switch control. Therefore, even if the network communication function is impaired, the normal state of the network communication function can be recovered as soon as possible.

On the other hand, according to the network abnormality recovery system of the invention, in each of the station units, first the monitor means executes monitor processing of monitoring the communication state in the network. The abnormality determination means executes abnormality determination processing of determining whether or not the network communication state is abnormal upon reception of the monitor processing result of the monitor means. When it is determined that the network communication state is abnormal as a result of the abnormality determination processing of the abnormality determination means, the route switch control means executes route switch control of switching the route of communication data generated by each slave station unit from the main data transmission line to the sub data transmission line. When the communication data route is switched from the main data transmission line to the sub data transmission line by the route switch control of the route switch control means, the maintaining information transmission means transmits at least the network maintaining information required for maintaining the network communication function to the master station unit over the sub data transmission line set by switching the route. Therefore, even if the network communication function is impaired, the normal state of the network communication function can be recovered as soon as possible.

What is claimed is:

1. A network abnormality recovery method in a network comprising a plurality of station units connected by a main data transmission line like a ring enabling circular transmission of communication data in digital form and adopting a master/slave method as a communication method, wherein said plurality of station units consist of one master station unit operating as a master and slave station units operating as slaves and wherein said network comprises one or more sub data transmission lines being provided separately from the main data transmission line for connecting said station units, said method comprising the steps of:

executing monitor processing of monitoring a communication state in said network;

executing abnormality determination processing of determining whether or not the network communication state is abnormal upon reception of the monitor processing result; and when it is determined that the network communication state is abnormal as a result of the abnormality determination processing, executing route switch control of switching a route of communication data generated by each slave station unit from the main data transmission line to the sub data transmission line and executing maintaining information transmission processing of transmitting at least network maintaining information required for maintaining the network communication function to said master station unit over the sub data transmission line set by the route switch control, by each of said plurality of station units.

2. The network abnormality recovery method as claimed in claim 1, wherein considering a capability of transmitting the network maintaining information, an information transmission medium of a low transmission capacity as compared with the main data transmission line is used as the sub data transmission line.

3. The network abnormality recovery method as claimed in claim 2, wherein the information transmission medium is a wake-up signal line used when said master station unit and each of said slave station units are connected in a one-to-one correspondence and a wake-up signal as a network starting up command of each slave station unit is transmitted from the master station unit to each slave station unit.

4. The network abnormality recovery method as claimed in claim 2, wherein the information transmission medium is a power line used to supply power to each station unit.

5. The network abnormality recovery method as claimed in claim 2, wherein the information transmission medium is an analog signal line used when said station units are connected and exchange analog communication data with each other.

6. The network abnormality recovery method as claimed in claim 2, wherein the information transmission medium is an analog signal line used when said master station unit and each of said slave station units are connected in a one-to-one correspondence and they exchange analog communication data with each other.

7. The network abnormality recovery method as claimed in claim 1, wherein the monitor processing step includes determining whether or not the reception state of communication data received from any other station unit than the home station unit is abnormal or whether or not communication data transmitted by the home station unit arrives at a receiving party, and wherein the abnormality determination processing step includes determining that the network communication state is abnormal when the communication data reception state is abnormal or the communication data does not arrive at the receiving party, upon reception of the monitor processing result.

8. The network abnormality recovery method as claimed in claim 7, wherein the monitor processing step includes assuming that the communication data transmitted by the home station unit does not arrive at the receiving party when communication data indicating reception of the communication data is not returned from the receiving party of the communication data transmitted by the home station unit.

9. The network abnormality recovery method as claimed in claim 1, wherein the network maintaining information includes control data containing control information for each station unit.

10. The network abnormality recovery method as claimed in claim 1, wherein said master station unit receives the network maintaining information transmitted from each station unit and has an information centralized management function of managing the received network maintaining information for each station unit in a centralized manner.

11. The network abnormality recovery method as claimed in claim 10, wherein if at least either of the network maintaining information reception function and the information centralized management function of said master station unit falls into an abnormal condition, any one of said plurality of station units except said master station unit operates as an alternative master station unit, thereby reconstructing said network.

12. The network abnormality recovery method as claimed in claim 11, wherein the station unit operating as the alternative master station unit is determined according to a predetermined priority.

13. A network abnormality recovery method in a network comprising a plurality of station units connected by a main data transmission line like a ring enabling circular transmission of communication data in digital form and adopting a master/slave method as a communication method, wherein said plurality of station units consist of one master station unit operating as a master and slave station units operating as slaves and wherein said network comprises one or more sub data transmission lines being provided separately from the main data transmission line for at least connecting said master station unit and said slave station units in a one-to-one correspondence, said method comprising the steps of:

executing monitor processing of monitoring a communication state in said network;

executing abnormality determination processing of determining whether or not the network communication state is abnormal upon reception of the monitor processing result; and when it is determined that the network communication state is abnormal as a result of the abnormality determination processing, executing route switch control of switching a route of communication data generated by each slave station unit from the main data transmission line to the sub data transmission line and executing maintaining information transmission processing of transmitting at least network maintaining information required for maintaining the network communication function to said master station unit over the sub data transmission line set by the route switch control, by each of said plurality of station units.

14. The network abnormality recovery method as claimed in claim 13, wherein considering a capability of transmitting the network maintaining information, an information transmission medium of a low transmission capacity as compared with the main data transmission line is used as the sub data transmission line.

15. The network abnormality recovery method as claimed in claim 14, wherein the information transmission medium is a wake-up signal line used when said master station unit and each of said slave station units are connected in a one-to-one correspondence and a wake-up signal as a network starting up command of each slave station unit is transmitted from the master station unit to each slave station unit.

16. The network abnormality recovery method as claimed in claim 14, wherein the information transmission medium is a power line used to supply power to each station unit.

17. The network abnormality recovery method as claimed in claim 14, wherein the information transmission medium is an analog signal line used when said station units are connected and exchange analog communication data with each other.

18. The network abnormality recovery method as claimed in claim 14, wherein the information transmission medium is an analog signal line used when said master station unit and each of said slave station units are connected in a one-to-one correspondence and they exchange analog communication data with each other.

19. The network abnormality recovery method as claimed in claim 13, wherein the monitor processing step includes determining whether or not the reception state of communication data received from any other station unit than the home station unit is abnormal or whether or not communication data transmitted by the home station unit arrives at a receiving party, and wherein the abnormality determination processing step includes determining that the network communication state is abnormal when the communication data reception state is abnormal or the communication data does not arrive at the receiving party, upon reception of the monitor processing result.

20. The network abnormality recovery method as claimed in claim 19, wherein the monitor processing step includes assuming that the communication data transmitted by the home station unit does not arrive at the receiving party when communication data indicating reception of the communication data is not returned from the receiving party of the communication data transmitted by the home station unit.

21. The network abnormality recovery method as claimed in claim 13, wherein the network maintaining information includes control data containing control information for each station unit.

22. The network abnormality recovery method as claimed in claim 13, wherein said master station unit receives the network maintaining information transmitted from each station unit and has an information centralized management function of managing the received network maintaining information for each station unit in a centralized manner.

23. The network abnormality recovery method as claimed in claim 22, wherein if at least either of the network maintaining information reception function and the information centralized management function of said master station unit falls into an abnormal condition, any one of said plurality of station units except said master station unit operates as an alternative master station unit, thereby reconstructing said network.

24. The network abnormality recovery method as claimed in claim 23, wherein the station unit operating as the alternative master station unit is determined according to a predetermined priority.

25. A network abnormality recovery system in a network comprising a plurality of station units connected by a main data transmission line like a ring enabling circular transmission of communication data in digital form and adopting a master/slave method as a communication method, wherein said plurality of station units consist of one master station unit operating as a master and slave station units operating as slaves, and wherein said network comprises one or more sub data transmission lines being provided separately from the main data transmission line for connecting said station units, characterized in that each of said plurality of station units comprises:

monitor means for executing monitor processing of monitoring a communication state in said network;

abnormality determination means for executing abnormality determination processing of determining whether or not the network communication state is abnormal upon reception of the monitor processing result of said monitor means;

route switch control means of executing route switch control of switching a route of communication data generated by each slave station unit from the main data transmission line to the sub data transmission line when it is determined that the network communication state is abnormal as a result of the abnormality determination processing of said abnormality determination means; and maintaining information transmission means for transmitting at least network maintaining information required for maintaining the network communication function to said master station unit over the sub data transmission line set by switching the route when the communication data route is switched from the main data transmission line to the sub data transmission line by the route switch control of said route switch control means.

26. The network abnormality recovery system as claimed in claim 25, wherein considering a capability of transmitting the network maintaining information, an information transmission medium of a low transmission capacity as compared with the main data transmission line is used as the sub data transmission line.

27. The network abnormality recovery system as claimed in claim 26, wherein the information transmission medium is a wake-up signal line used when said master station unit and each of said slave station units are connected in a one-to-one correspondence and a wake-up signal as a network starting up command of each slave station unit is transmitted from said the master station unit to each slave station unit.

28. The network abnormality recovery system as claimed in claim 26, wherein the information transmission medium is a power line used to supply power to each station unit.

29. The network abnormality recovery system as claimed in claim 26, wherein the information transmission medium is an analog signal line used when said station units are connected and exchange analog communication data with each other.

30. The network abnormality recovery system as claimed in claim 26, wherein the information transmission medium is an analog signal line used when said master station unit and each of said slave station units are connected in a one-to-one correspondence and they exchange analog communication data with each other.

31. The network abnormality recovery system as claimed in claim 25, wherein the monitor processing of said monitor means includes determining whether or not the reception state of communication data received from any other station unit than the home station unit is abnormal or whether or not communication data transmitted by the home station unit arrives at a receiving party, and wherein the abnormality determination processing of said abnormality determination means includes determining that the network communication state is abnormal when the communication data reception state is abnormal or the communication data does not arrive at the receiving party, upon reception of the monitor processing result of said monitor means.

32. The network abnormality recovery system as claimed in claim 31, wherein the monitor processing of said monitor means includes assuming that the communication data transmitted by the home station unit does not arrive at the receiving party when communication data indicating reception of the communication data is not returned from the receiving party of the communication data transmitted by the home station unit.

33. The network abnormality recovery system as claimed in claim 25, wherein the network maintaining information includes control data containing control information for each station unit.

34. The network abnormality recovery system as claimed in claim 25, wherein said master station unit further includes:
    maintaining information reception means for receiving the network maintaining information transmitted from each station unit; and
    information centralized management means having an information centralized management function of managing in a centralized manner the network maintaining information for each station unit received at said maintaining information reception means.

35. The network abnormality recovery system as claimed in claim 34, wherein if at least either of the network maintaining information reception function and the information centralized management function of said master station unit falls into an abnormal condition, any one of said plurality of station units except said master station unit operates as an alternative master station unit, thereby reconstructing said network.

36. The network abnormality recovery system as claimed in claim 35, wherein the station unit operating as the alternative master station unit is determined according to a predetermined priority.

37. A network abnormality recovery system in a network comprising a plurality of station units connected by a main data transmission line like a ring enabling circular transmission of communication data in digital form and adopting a master/slave method as a communication method, wherein said plurality of station units consist of one master station unit operating as a master and slave station units operating as slaves, and wherein said network comprises one or more sub data transmission lines being provided separately from the main data transmission line for at least connecting said master station unit and said slave station units in a one-to-one correspondence, characterized in that
    each of said plurality of station units comprises:
    monitor means for executing monitor processing of monitoring a communication state in said network;
    route switch control means of executing route switch control of switching a route of communication data generated by each slave station unit from the main data transmission line to the sub data transmission line when it is determined that the network communication state is abnormal as a result of the abnormality determination processing of said abnormality determination means; and
    maintaining information transmission means for transmitting at least network maintaining information required for maintaining the network communication function to said master station unit over the sub data transmission line set by switching the route when the communication data route is switched from the main data transmission line to the sub data transmission line by the route switch control of said route switch control means.

38. The network abnormality recovery system as claimed in claim 37, wherein considering a capability of transmitting the network maintaining information, an information transmission medium of a low transmission capacity as compared with the main data transmission line is used as the sub data transmission line.

39. The network abnormality recovery system as claimed in claim 38, wherein the information transmission medium is a wake-up signal line used when said master station unit and each of said slave station units are connected in a one-to-one correspondence and a wake-up signal as a network starting up command of each slave station unit is transmitted from said the master station unit to each slave station unit.

40. The network abnormality recovery system as claimed in claim 38, wherein the information transmission medium is a power line used to supply power to each station unit.

41. The network abnormality recovery system as claimed in claim 38, wherein the information transmission medium is an analog signal line used when said station units are connected and exchange analog communication data with each other.

42. The network abnormality recovery system as claimed in claim 38, wherein the information transmission medium is an analog signal line used when said master station unit and each of said slave station units are connected in a one-to-one correspondence and they exchange analog communication data with each other.

43. The network abnormality recovery system as claimed in claim 37, wherein the monitor processing of said monitor means includes determining whether or not the reception state of communication data received from any other station unit than the home station unit is abnormal or whether or not communication data transmitted by the home station unit arrives at a receiving party, and wherein the abnormality determination processing of said abnormality determination means includes determining that the network communication state is abnormal when the communication data reception state is abnormal or the communication data does not arrive at the receiving party, upon reception of the monitor processing result of said monitor means.

44. The network abnormality recovery system as claimed in claim 43, wherein the monitor processing of said monitor means includes assuming that the communication data transmitted by the home station unit does not arrive at the receiving party when communication data indicating reception of the communication data is not returned from the receiving party of the communication data transmitted by the home station unit.

45. The network abnormality recovery system as claimed in claim 37, wherein the network maintaining information includes control data containing control information for each station unit.

46. The network abnormality recovery system as claimed in claim 37, wherein said master station unit further includes:

maintaining information reception means for receiving the network maintaining information transmitted from each station unit; and information centralized management means having an information centralized management function of managing in a centralized manner the network maintaining information for each station unit received at said maintaining information reception means.

47. The network abnormality recovery system as claimed in claim 46, wherein if at least either of the network maintaining information reception function and the information centralized management function of said master station unit falls into an abnormal condition, any one of said plurality of station units except said master station unit operates as an alternative master station unit, thereby reconstructing said network.

48. The network abnormality recovery system as claimed in claim 47, wherein the station unit operating as the alternative master station unit is determined according to a predetermined priority.

* * * * *